United States Patent [19]

Cabagnero

[11] 4,118,052
[45] Oct. 3, 1978

[54] COLLAPSIBLE STROLLER

[76] Inventor: Ramon Jané Cabagnero, 203 Cartagena St., Barcelona, Spain

[21] Appl. No.: 796,704

[22] Filed: May 13, 1977

[30] Foreign Application Priority Data

May 26, 1976 [ES] Spain ............................... 221.222[U]
Jul. 6, 1976 [ES] Spain ............................... 222.387[U]
Oct. 22, 1977 [ES] Spain ............................... 224.112[U]

[51] Int. Cl.² .............................................. B62B 11/00
[52] U.S. Cl. ..................................... 280/642; 280/650
[58] Field of Search .............. 280/642, 647, 650, 641, 280/644

[56] References Cited

U.S. PATENT DOCUMENTS

| 3,390,893 | 7/1968 | MacLarren | 280/644 X |
| 3,836,164 | 4/1974 | Sugino et al. | 280/642 |
| 3,917,302 | 11/1975 | Gebhard | 280/650 X |
| 4,062,555 | 12/1977 | Peng et al. | 280/650 X |

Primary Examiner—Robert R. Song
Assistant Examiner—Norman L. Stack
Attorney, Agent, or Firm—Cushman, Darby & Cushman

[57] ABSTRACT

The disclosure embraces a collapsible stroller having a bottom cross frame and a back cross frame which are pivotably interconnected each to separate wheel support struts. Seat support arms are pivotably connected between the rear wheel support struts and the front wheel support struts and a back rest support frame is pivotably connected at one end to the seat portion support arms but adjustably connected to the rear wheel support struts so that the angle of inclination of the back rest can be adjusted.

6 Claims, 9 Drawing Figures

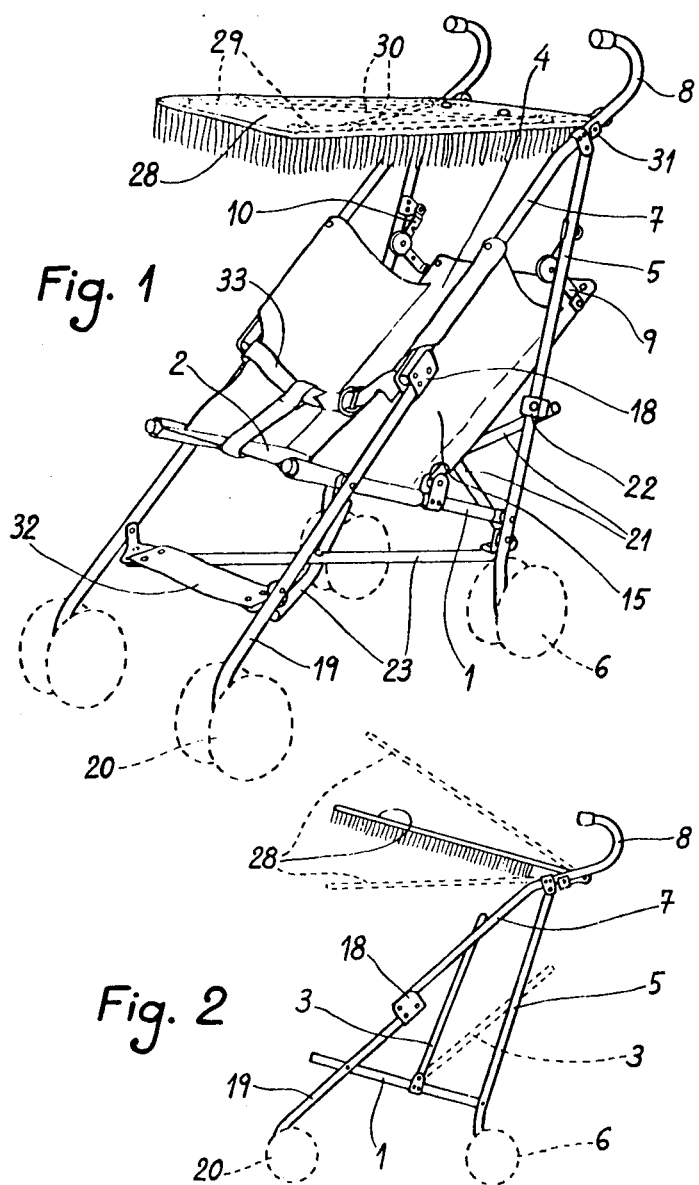

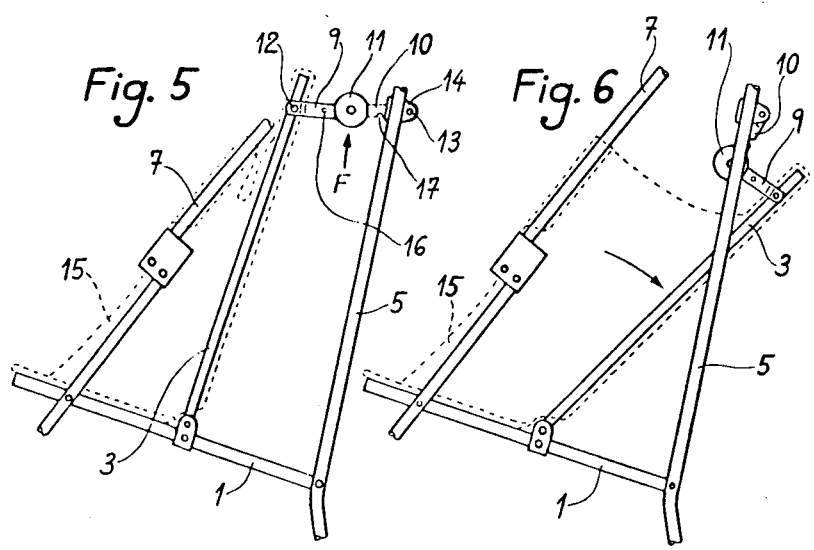
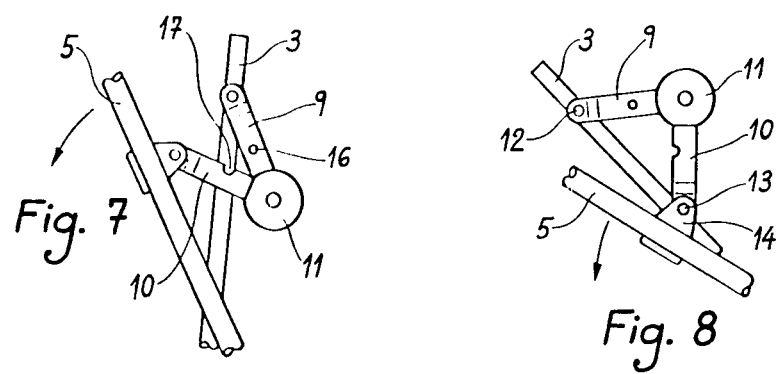
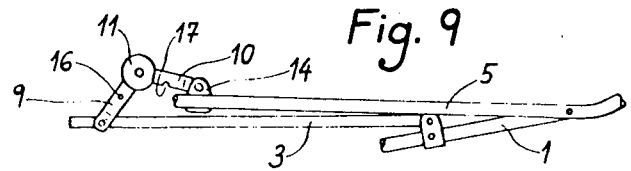

COLLAPSIBLE STROLLER

BACKGROUND AND SUMMARY OF THE INVENTION

This invention relates to collapsible strollers and, particularly, to those types of strollers that employ crossed frame members to support and define the chassis in the unfolded condition.

In known type of collapsible strollers such as is disclosed in U.S. Pat. No. 3,390,893, the seat portion has generally consisted of flexible material which is attached to a seat frame and which gives fairly good base support to the child. However, in known structures, the back rest portion of the seat has generally lacked any rigidity so that small infants would tend to slump over when unattended. Also, prior seating arrangements have lacked any adjustability such as was possible with the non-folding type of strollers where an infant could be maintained in an upright seated position when awake and then be permitted to recline to a rest position for sleep.

The present invention overcomes these drawbacks by providing, in a completely collapsible stroller, a firm backrest frame for the child and one which is angularly adjustable to a wide range of positions. Further, the stroller of the present invention will still be completely collapsible thereby retaining the advantage of ease of transport and storage of the stroller when not in use.

The foregoing and other advantages will become apparent as consideration is given to the following detailed description taken in conjunction with the accompanying drawings, in which:

BRIEF DESCRIPTION OF THE DRAWINGS

FIG. 1 is a perspective view of the collapsible stroller of the present invention;

FIG. 2 is a side view in elevation of a schematic illustration of the stroller of FIG. 1;

FIGS. 5 and 6 are illustrations of the adjustability of the back rest portion of the seat of the stroller of the present invention; and FIGS. 7, 8 and 9 are views illustrating the adjustable linking means for the back rest of the seat of the present invention.

DETAILED DESCRIPTION OF THE INVENTION

Figure 3:
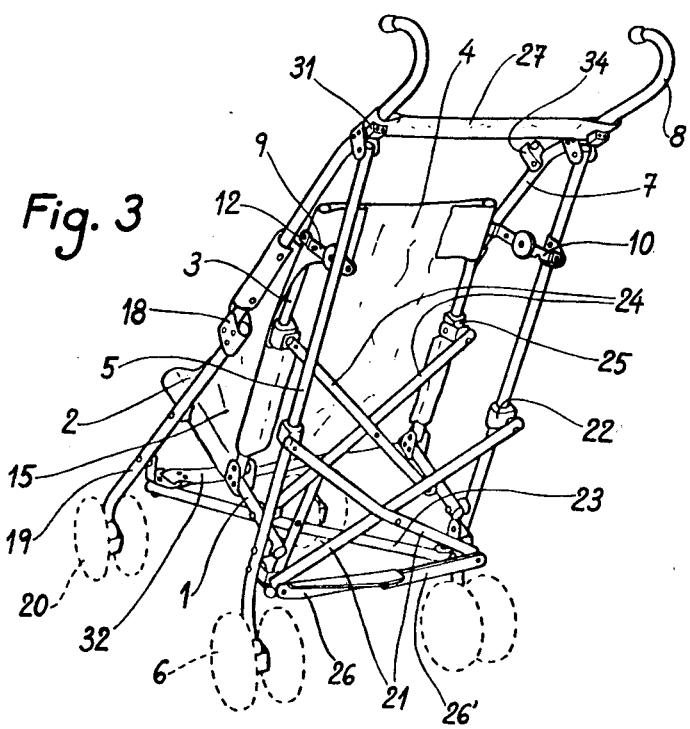
FIG. 3 is a rear perspective view of the stroller of FIG. 1.

Referring now to the drawings wherein like numerals designate corresponding parts throughout the several views, there is illustrated in FIG. 1 a perspective view of the stroller of the present invention which is provided with seat support arms 1 for a seat 2 made of flexible material. The seat 2 may be mounted on the support arms 1, as illustrated, by sewing tubular channels on the outer extremities of the flexible material through which the support arms extend.

A pair of back rest support arms 3 (FIG. 2) are pivotably connected intermediate the ends of each of the seat support arms 1. A flexible back rest 4 is secured across the frame defined by the pair of back rest support arms 3 in the same manner as the seat portion 2 is secured to the seat support arms 1 as is more clearly shown in the rear view of FIG. 3.

Adjacent the upper ends of the back rest support arms 3, according to the present invention, there are provided a pair of articulated linkages each of which has a first arm 9 and a second arm 10 and an articulated or rotary joint 11. Arm 9 is pivotably connected at 12 adjacent the upper end of a back rest support arm 3 as more clearly shown in FIGS. 5 and 6. The second arm 10 of the linkage is pivotably connected to a rear wheel support strut 5. At the lower end of each of the support struts 5 there are provided dual wheels 6. The pivot connections between the arms 9 and 10 to the associated back rest support arm 3 and rear wheel strut 5 may be by rivets 12 and 13 or other suitable pivot connections. If desired, a separate clinching member 14 may be secured on the strut 5 to which the rivet 13 is attached.

According to the present invention, a side panel fabric 15 may be secured on the pair of front wheel support struts which are foldable at the articulated pivot connection 18 whereby, in the collapsed condition, the upper arm 7 of the front wheel support strut will lie closely adjacent to the lower portion 19 of the front wheel support strut.

Figure 4:
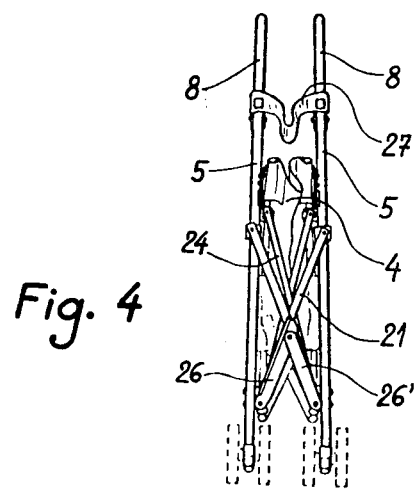
FIG. 4 is a rear view of the stroller of FIG. 1 in a collapsed condition.

A rear view of the collapsed stroller is illustrated in FIG. 4 while in FIGS. 5 and 6 two extreme limits of the adjustable angular positioning of the back rest support arms 3 is illustrated where it will be seen that the side panel fabric 15 in FIG. 6 limits the angular tilting of the back rest support arms 3 when fully expanded between front wheel strut 7 and back rest support arm 3.

In order to prevent the first arm 9 and second arm 10 of the linkage means of the back rest support from crossing each other during use or during collapsing of the stroller, the first arm 9 is provided with a transversely extending pin 16 while the second arm 10 is provided with a notch 17 so that, in the event arms 9 and 10 are pivoted so that they approach each other, pin 16 will engage notch 17 and prevent further relative movement of these arms together.

The main frame of the stroller of the present invention includes the previously noted rear pair of rear wheel support struts 5 which are pivotably connected each of their upper ends to the front wheel support struts consisting of elements 7 and 19, previously described. Each of the elements 19 have at their lower ends dual wheels 20.

In order to give more rigidity to the stroller structure during use, according to the present invention, a back cross frame which includes two interpivoted rigid arms 21 are provided, with, at their upper ends, are each slidably connected as by sockets at 22 to the struts 5. Also, a bottom cross frame including two interpivoted rigid arms 23 is provided with each of the forward ends of the arms 23 being pivotably connected to the struts 19 adjacent the foot rest 32. The rear ends of the arms 23 are pivotably interconnected with the lower ends of the arms 21 of the back cross frame. Of course, the pivot connection linking the two pairs of cross frames must also be pivotably connected to the lower portion of the rear wheel struts 5.

In order to give greater stability and back support to the back rest 4, a third cross frame consisting of interpivoted rigid arms 24 is provided where the lower ends of the arms 24 are each pivotably connected to the seat support arms 1 at a point intermediate the seat support arms connection to the struts 5 and the back rest support arms 3. The upper ends of the arms 24 are slidably connected as at 25 on the back rest support arms 3 so that angular adjustment of the back rest arms 3 relative to the seat support arms 1 can be easily effected.

In order to lock the stroller assembly in its unfolded position, a pair of brace arms 26 and 26' are pivotably connected to span, when unfolded, the pivotal connection between the back cross frame and the bottom cross frame. Thus, collapsing of the stroller is initiated by pivoting the arms 26 and 26' upward as shown in FIG. 4.

Between the handles 8 a flexible strap 27 should be provided to restrain separation of the main frame members consisting of the struts 5 and the foldable front wheel support struts consisting of the tubular arms 7 and 19.

A sun shade 28 may be mounted on the handle 8 to be pivotable with respect thereto as shown in FIG. 2. Also, the shade 28 may be collapsible by the provision of parallel side arms 29 which are connected by articulated crossed bars 30 which may be connected at their ends by joints 31 to the handles 8. A flexible foot rest 32, of course, may be suspended between the arms 19 of the front wheel support struts. Also, a protective seat belt 33 may be suitably employed and may be attached either to the front wheel support struts or to the fabric panels 15.

When the stroller is collapsed, a retaining member 34 may be employed to grasp securely the arm 19 of the front wheel foldable support strut to hold it in the collapsed position adjacent the upper arm 7.

While the foregoing has been a description of the preferred embodiment, it will be obvious to those skilled in the art that various modifications may be made therein without departing from the spirit and scope of the present invention as defined in the appended claims.

What is claimed is:

1. A collapsible stroller comprising a bottom cross frame including interpivoted rigid arms, a back cross frame including interpivoted rigid arms, a pair of pivot means each for interconnecting an arm of said bottom cross frame to an arm of said back cross frame at one end of each of said respective arms so that said bottom and back cross frames are pivotable relative to each other and said arms of each cross frame are pivotable relative to each other,
a pair of front wheel foldable support struts, a pair of rear wheel rigid support struts, said front and said rear wheel struts each having wheel means rotatably supported on an end thereof respectively, a pair of strut pivot means each pivotably connecting a said front and a said rear wheel strut at the other ends thereof, the other ends of said arms of said back frame being each slidably connected to a rear wheel strut, the other ends of said arms of said bottom cross frame being each pivotably linked to a said foldable front wheel strut at a point thereof adjacent said wheel means, a pair of seat support arms each having one end pivotably linked to a said front wheel strut and the other end thereof pivotably linked to a said rear wheel strut, a pair of back rest support arms each having one end pivotably linked to a said support arm at a point between said front and rear wheel struts, a pair of linking means each for linking the other end of a said back rest support arm to a said rear wheel support strut, said linking means being adjustable to vary the angular position of said back rest support arms relative to said seat support arms.

2. The stroller as claimed in claim 1 wherein a back rest cross frame is provided including interpivoted rigid arms having first ends pivotably connected one to one of said seat support arms and the other to the other of said seat support arms, and second ends slidably connected one to one of said back rest support arms and the other to the other of said back rest support arms.

3. The stroller as claimed in claim 1 wherein a flexible link is provided between said front wheel foldable support struts adjacent said strut pivot means.

4. The stroller as claimed in claim 1 wherein a flexible seat material is provided on and extending between said seat support arms and between said back rest support arms and between a portion of each of said front wheel foldable support struts and each back rest support arm and wherein the length of said flexible material between said front wheel foldable support struts and said back rest support arms limits the angular position said back rest support arms assume relative to said seat support arms.

5. The apparatus as claimed in claim 1 wherein said linking means each comprises a first arm, a second arm, an articulation joint connecting said first arm and said second arm, and means for preventing said first and second arms from crossing each other when said linking means are adjusted.

6. The apparatus as claimed in claim 5 wherein said preventing means includes a pin projecting from said first arm and a notch on said second arm located so that when said first arm is moved in a direction toward said second arm, said pin will intercept said notch to prevent further relative movement in said direction.

* * * * *